Feb. 4, 1930.  T. BROWN  1,746,188
OPTICAL APPLIANCE FOR ADVERTISEMENT AND OTHER PURPOSES
Filed July 24, 1926  3 Sheets-Sheet 1

Inventor
Theodore Brown,
by H. B. Willson & Co.
Attorneys

Feb. 4, 1930. T. BROWN 1,746,188
OPTICAL APPLIANCE FOR ADVERTISEMENT AND OTHER PURPOSES
Filed July 24, 1926 3 Sheets-Sheet 2
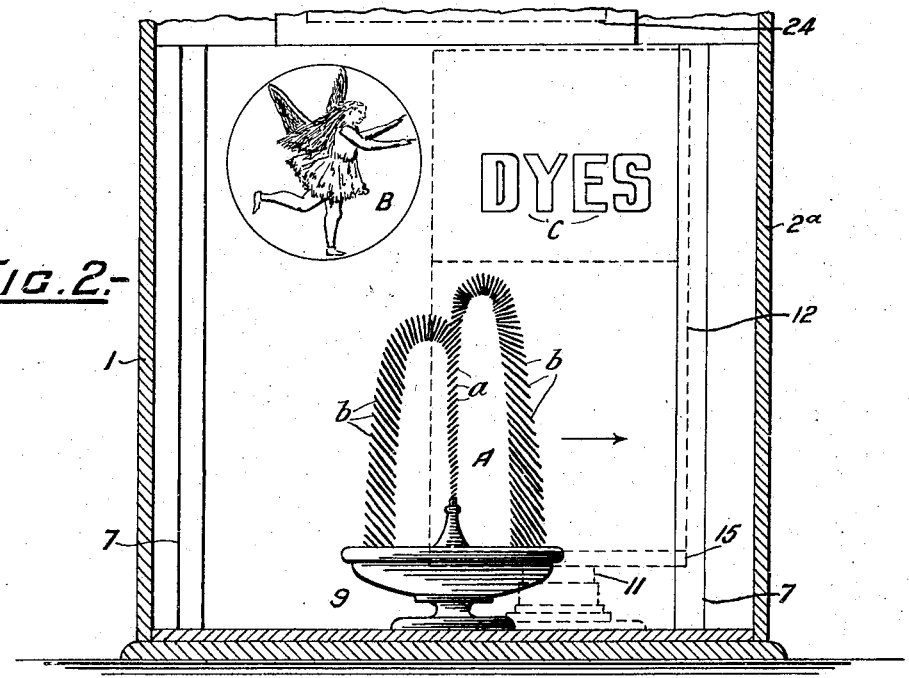
-FIG.2.-
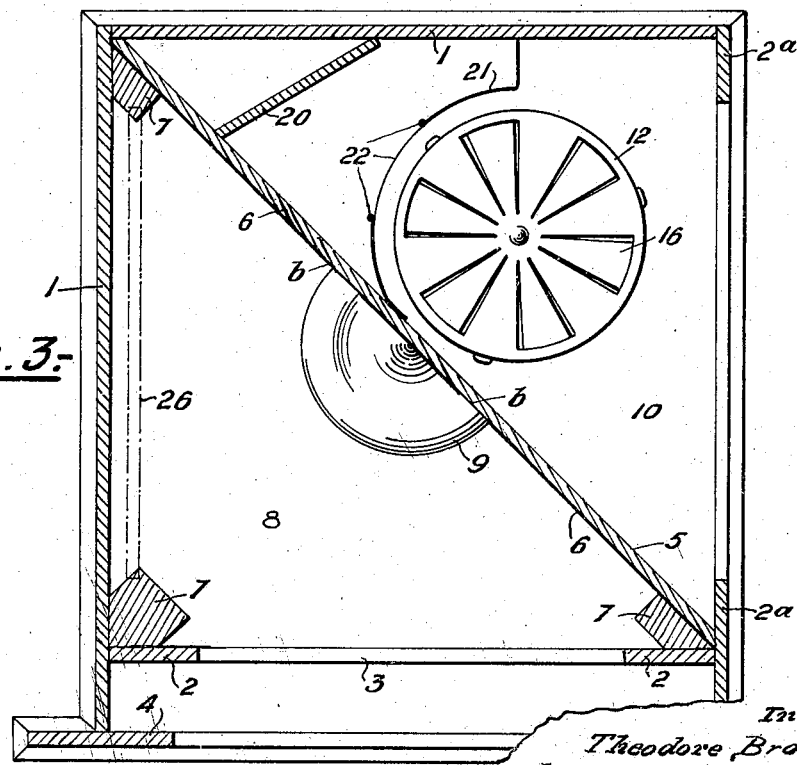
-FIG.3.-
Inventor
Theodore Brown,
by H.B. Willson & Co.
Attorneys

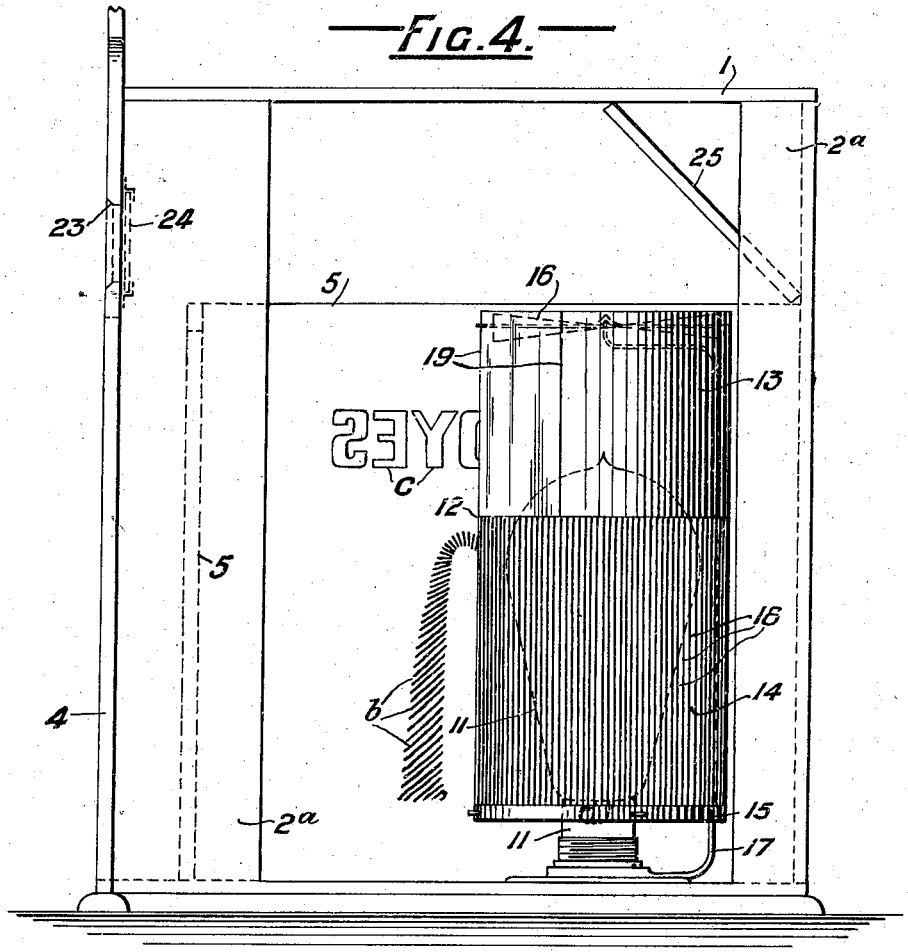
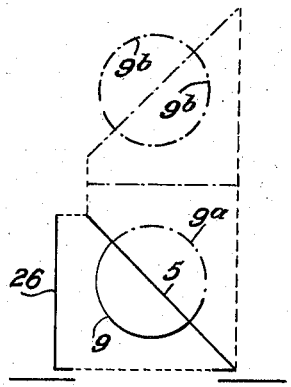
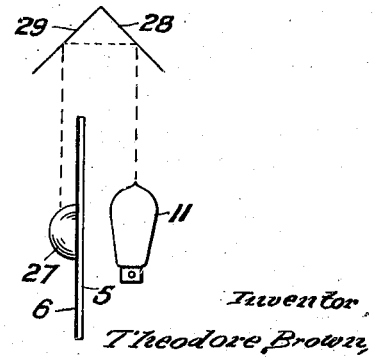

Patented Feb. 4, 1930

1,746,188

UNITED STATES PATENT OFFICE

THEODORE BROWN, OF STREATHAM, LONDON, ENGLAND

OPTICAL APPLIANCE FOR ADVERTISEMENT AND OTHER PURPOSES

Application filed July 24, 1926, Serial No. 124,714, and in Great Britain July 25, 1925.

This invention relates to improvements in optical illusions for advertisement and other purposes and relates more particularly to that type of optical device in which a mirror or mirrors are employed for reflecting objects or parts of objects in such manner that the reflection or reflections appear to an observer as real objects situated at a place where in actual fact, they do not exist.

The object of this invention is to provide an improved device of this kind by means of which the half of a real object and the reflection thereof may be caused to coincide and give the impression of a solid symmetrical body. A further object is to produce certain effects, visible to an observer in front of the mirror, by the use of illuminating means in conjunction with specially prepared surfaces on the said mirror.

According to this invention the mirror is silvered upon the face nearest the object or objects to be reflected, said objects taking the form of half sections of articles and the said mirror is etched on the silvered surface or otherwise treated to allow of the transmission of light from the rear of the mirror when so required.

In one way of carrying the invention into effect a mirror silvered on that face which is nearest the objects to be reflected is positioned diagonally of a box-shaped compartment so that it makes an angle of forty-five degrees with the sides thereof and that side of the compartment which is opposite the silver surface is open. The appearance thus given to an observer looking into the open side of the compartment is that of a symmetrical compartment which is composed of that portion of the same which is in front of the silvered surface together with the reflection thereof in the mirror.

To produce the illusion of any object standing for example in the centre of the compartment a half section of said object is cemented to the silvered surface of the mirror. For example, to produce the effect of a fountain basin positioned centrally of the compartment, a half section of a fountain basin is affixed to the mirror centrally of its length, the combination of the real object together with the reflection thereof appearing to an observer as a whole fountain basin.

In order to create the impression of water playing from said fountain the silver surface of the mirror is first partially etched away, over that area which would be covered by the water, so as to leave oblique lines of silvered surface which alternate with clear glass.

The slope of said oblique lines is so arranged that for the portion of the water which is to appear to be rising their inclination is at right angles to the inclination of the lines which are to represent the falling water. Behind the mirror is provided a semi-transparent cylinder illuminated from within by means of an electric lamp and adapted to rotate about its longitudinal axis which is vertically situated. On the surface of the said cylinder a continuous series of vertical opaque lines are drawn, the cylinder being caused to rotate slowly under the influence of the heated air arising from the lamp which acts on a fan in the well-known manner.

When an observer views the arrangement from the front, the transmission of light through the etched portions of the mirror will be continuously changing owing to the movement of the shadows of the opaque lines over said etched portions. The effect obtained by such movement is that the light appears to be running down the one set of oblique transparent portions and running up the other set, and the illusion is created of water spouting up from the fountain basin and falling back into the same.

In a modification of the invention the mirror may be placed at right-angles to the walls of the compartment in order that various forms of objects may be used in conjunction therewith.

Supplementary mirrors may be provided for the purpose of reflecting light from the lamp to the front of the main mirror or to special portions of the same, and also in order to produce spectral images of the objects placed in front of the main mirror.

The invention will now be more particularly described with reference to the accompanying drawings, in which Fig. 1 is a front elevation of an optical illusion apparatus constructed according to this invention, and having a proscenium or ornamental frame-work front.

Fig. 2 is a front elevation of the apparatus with the proscenium removed,

Fig. 3 is a horizontal section of the device,

Fig. 4 is a side elevation of the apparatus a side door being supposed removed to show the rotatable cylinder and the illuminating means, Fig. 5 is a diagram indicating the effect produced with a supplementary mirror and Fig. 6 is a diagrammatic view of the use of supplementary mirrors to illuminate the front of the main mirror.

Figure 1:
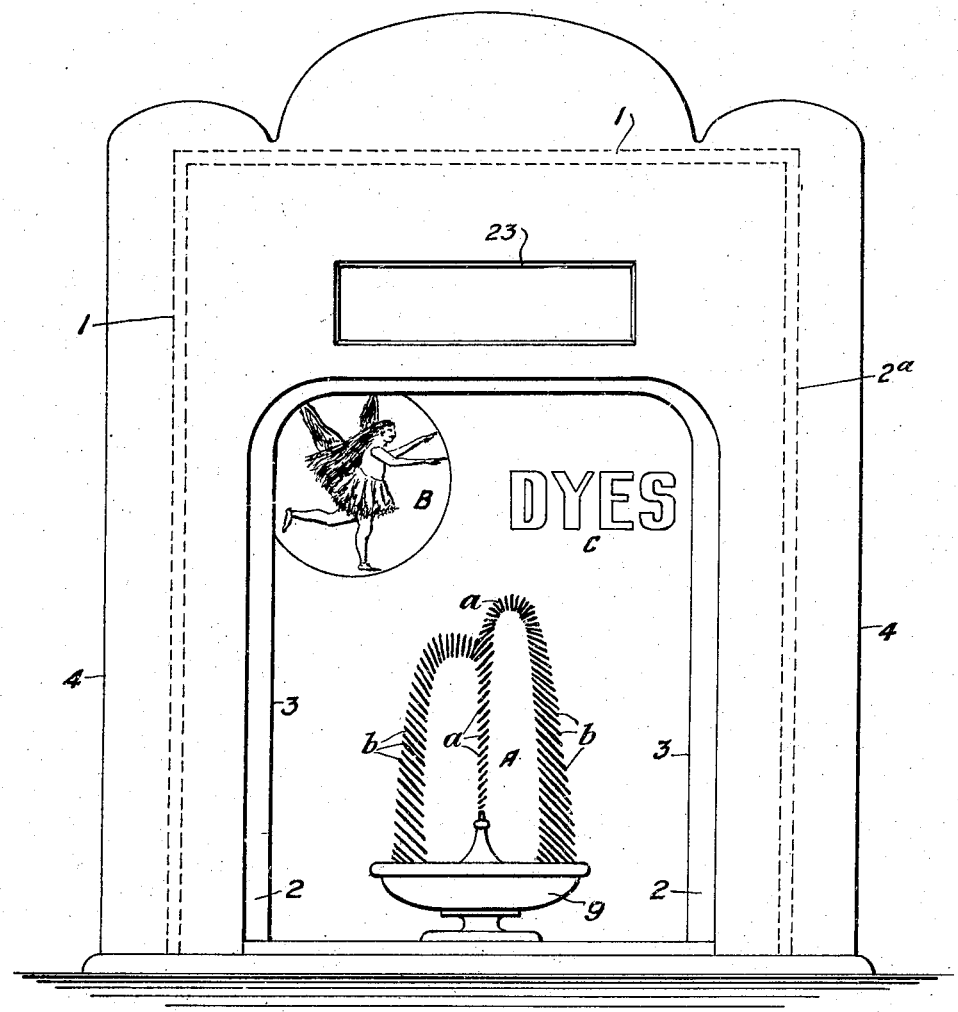

In the preferred form of the optical illusion apparatus according to this invention the apparatus is mounted within a box-shaped compartment 1 having in the front 2 an opening 3 which may be of any suitable size. A proscenium 4 of any suitable shape is provided in front of said aperture in order to give a finished and neat appearance to the arrangement. In the side 2ª an opening is left to give access to the space behind the mirror 5 and is fitted with a suitable door (not shown).

The mirror 5 is arranged diagonally of the compartment 1 (as shown in Fig. 3) with the silvered face 6 thereof directed towards the openings in the front of the compartment and proscenium. The silver is highly burnished and as a precaution against tarnishing of the silver, otherwise exposed, it is covered with a coating of hard transparent solution.

Wooden fillets or blocks 7 may be employed to fix the mirror firmly in position.

The front half 8 of the compartment 1 is utilized to produce illusions due simply to reflection in the mirror, such as that of a whole fountain basin standing in the centre of a compartment, as already described.

The half section of the fountain basin is indicated at 9 in the drawings and it is cemented to the silvered face 6 of the mirror in order that no apparent joint shall be visible in the combination of the object and the reflection thereof.

In the rear half 10 of the compartment, a source of light such as an electric lamp, 11, (Fig. 4) is provided and supported thereon in any well known manner, as by a wire 17 is a hollow cylinder 12 adapted to be rotated by the hot air rising from the said lamp.

The said cylinder is composed partly of opaque material 13 and partly of semi-transparent material 14, suitable stiffening means 15 being provided at the lower edge of the latter in order to maintain the cylindrical form thereof. A fan 16 of the well-known type is provided at the upper end of the cylinder which will thus be caused to rotate under the action of the hot air rising from the lamp 11.

The portion 14 of the cylinder 12 is ruled with parallel opaque, vertical lines 18 while the upper opaque portion 13 has a section removed from one side thereof to leave an open space 19.

The said space may however be closed by means of any suitable transparent or semi-transparent material.

Referring now to the mirror 5 and the preparation of the same, it will be seen from Figs. 1 and 2 that there are three designs thereon indicated by A, B and C, which may consist of any desired advertising or other matter.

A, in the drawings, indicates the portion of the mirror which is etched with oblique lines over the area which would correspond with the path of the water from the fountain basin 9. The said lines are inclined in one direction, as at $a$, for the space which would be covered by the rising jet of water, and inclined in the opposite direction, as at $b$, for indicating the descending water.

The silvered surface 6 of the mirror is removed by said etching so that there are alternate lines of light-transmitting and light-reflecting surface over the area representing the water playing from the fountain.

When the electric lamp 11 is switched on, the specially prepared cylinder 12 begins to rotate under the action of the hot air rising from said lamp.

The shadows of the vertical lines 18 travel across the etched portion of the mirror from right to left, or vice versa, their direction of travel depending on the direction of rotation of the cylinder 12.

As shown by means of the arrow in Fig. 2 the direction of rotation of the said cylinder is from left to right and hence alternate bands of darkness and light also traverse the mirror from left to right.

The appearance presented to an observer looking through the opening in the proscenium 4 is that of a fountain playing from the basin 9.

This effect is produced by the light travelling from left to right of the transparent lines $a$ and hence appearing to move upwardly, whilst upon travelling from left to right of the lines $b$ it appears to move downwardly. The total effect therefore is that of an upward jet of water replacing the lines $a$ and of two downward streams of water replacing the lines $b$.

The device indicated at B is caused to appear intermittently and to create the illusion of appearing in mid air. This effect is obtained by suitably etching away the silvered surface of the mirror to give a stippled effect over the area covered by the device which, in the example shown, is a representation of a fairy.

By arranging the representation B at a suitable height on the mirror 5 the light from the lamp 11 is prevented intermittently from reaching the said representation B by the opaque portion 13 of the cylinder 12 so that the part B becomes invisible. Upon rotation of the said cylinder however the transparent or open portion 19 thereof is brought between the lamp 11 and the device B.

Light is then allowed to fall upon the said device and it becomes visible to an observer looking through the opening in the proscenium 4. Upon further rotation of the cylinder 12 the light from the lamp 11 is again cut off from the device B and it again becomes invisible from the front of the mirror.

In order to cause a gradual appearance and disappearance of the said device a supplementary mirror 20 may be provided at the rear of the mirror 5, together with a screen 21 having an opening 22. Said screen and opening are so arranged relatively to the lamp 11 and the mirror 5 that light from said lamp is prevented from falling directly on the device B. When the opening 19 of the cylinder 12 rotates before the opening 22 in the screen the light transmitted through said openings is allowed to fall upon the mirror 20 and is reflected thence to the back of the device B. The intensity of illumination of said device will vary directly with the amount of the opening 19 which is in register with the opening 22 in the screen 21, hence there will be visible a gradual appearance and disappearance of the device as the cylinder 12 rotates. Instead of removing part of the silver deposit from the mirror by etching, the precipitation or deposit of the silver may be controlled during the process of manufacture of the mirror so that it varies in thickness at the pre-determined sections which are to be rendered semi-transparent.

The device indicated at C may be treated in a similar manner to the device B and in the example shown consists of the word "dyes" although any suitable advertising matter may be employed.

The word may be caused to appear suddenly and to disappear as suddenly or on the other hand may be caused to appear and disappear gradually in exactly the same manner as the fairy.

These said devices B and C appear to the observer to become visible in mid air above the fountain A, owing to the fact that the presence of the mirror 5 is not appreciated by the said observer.

In a modification of this form of the apparatus the advertising matter may be interchanged by a very simple operation. The mirror 5 is etched on the silvered face 6 to produce a stippled effect over the area to be covered by the advertising matter, sufficient silver being left on the mirror to reflect light from the front thereof.

The desired advertisement set out on transparent material is then affixed to the rear of the mirror to register with the stippled portion thereof so that upon illumination of said advertisement from the rear it will become visible to an observer in front of said mirror.

The proscenium 4 may be provided with an opening 23 adapted to receive advertising matter as indicated at 24 in Fig. 4.

In order to illuminate said opening 23 a supplementary mirror 25 may be provided above the lamp 11, adapted to reflect light passing upward through the fan 16, which is made in this case of mica or other suitable transparent material, on to the said opening 23.

In a further modification of the invention a plate glass mirror 26 may be provided in one side of the compartment 1 in order to produce further images of the objects arranged in the front half 8 of the compartment. This mirror 26 is shown in chain lines in Fig. 3 and the effect produced thereby is shown diagrammatically in Fig. 5.

The mirrors 5 and 26 are shown in full lines in said figure together with the half section 9 of the fountain basin. The reflection of the said section 9 in the mirror 5 is indicated at $9^a$.

The observer looking into the mirror 5 will see therein a reflection of the mirror 26, in which in turn there is a reflection $9^b$ of the fountain comprised by the part 9 and its reflection $9^a$.

As the mirror 26 is plain glass and unsilvered it will not be visible to the observer and he will merely see the reflection $9^b$ of the fountain 9, $9^a$, appearing to be situated behind the mirror 5. The effect of the mirror 26 is hence to give the impression to the observer of a compartment, of double the depth of the compartment 1, in which there are two fountains.

The arrangement shown in Fig. 6 allows of the appearance of bubbles or other spherical objects floating in mid air to be achieved. The appearance of a bubble or other spherical object is formed by a half section 27 of the said object together with the reflection thereof in the mirror 5.

In order to illuminate the half section 27, which is affixed to the front silvered face 6 of the mirror, two mirrors 28, 29 are provided. The mirror 28 is arranged at an angle of 45 degrees to the vertical axis of the lamp 11 and the mirror 29 is arranged at right angles to the mirror 28. By means of this arrangement the light passing vertically through the fan 16 (not shown) from the lamp 11 is reflected horizontally from mirror 28 to mirror 29 and thence vertically downwards to the half sphere 27. The path taken by the light rays is indicated in the diagram (Fig. 6) by means of a broken line.

Having now particularly described and ascertained the nature of my said invention and in what manner the same is to be performed I declare that what I claim is:—

1. An apparatus for creating optical illusions for use in advertising and for other purposes comprising a mirror which is silvered upon the face nearest the object to be reflected, an object in the form of a half section held in contact with the silvered surface of the mirror so that the real half object and its reflected image combine to produce the appearance of a complete symmetrical body, a portion of the silvered surface of the mirror being removed to render that part transparent and means for transmitting light through said transparent part of the mirror.

2. An apparatus for creating optical illusions, for use in advertising and other purposes comprising a box open on one side, a glass mirror silvered on the surface opposite the open side mounted diagonally in the box so as to divide the same into front and rear compartments and having a portion of the silvering omitted to permit of the passage of light through the mirror, an object in the form of a half section applied to the silvered surface of the mirror so that the real half and the reflected half of the object combine to produce the appearance of a complete symmetrical body, a source of light in the rear compartment of the box adapted to create an upward current of air and a hollow cylinder adapted to be rotated by the current of air arising from the source of light.

3. An apparatus according to claim 2, wherein the source of light is an electric lamp and the hollow cylinder is composed partly of opaque material and partly of semi-transparent material, the said semi-transparent portion being ruled with parallel opaque vertical lines and the said opaque portion having a section removed from one side thereof to leave an open space.

4. An apparatus according to claim 2 including the removal of the silvering from another part of the mirror to produce a stippled effect to allow of the transmission of light from said light source to the front of the mirror in order to create the illusion of objects appearing in mid air within the box.

5. An apparatus according to claim 2 including an electric lamp in the rear compartment, a rotary cylinder partly opaque and partly translucent surrounding the lamp part of the translucent portions in the mirror being arranged at such a height that the light from the lamp is intermittently cut off from them by the opaque portion of the rotating cylinder.

6. An apparatus according to claim 2 wherein the illusion is created of water playing from a fountain basin, the reflected object consisting of a half section of a fountain basin which together with its reflection in the mirror has the appearance of a complete fountain basin.

7. An apparatus according to claim 2 including the removal of other portions of the silvering from another part of the mirror to produce a stippled effect, an object located behind said unsilvered strippled part for display therethrough, a cylinder mounted to rotate around the light and adapted alternately to screen and expose the same to the mirror, and also having an apertured opaque portion, an apertured screen, operating in conjunction with the aperture in the opaque portion of the rotating cylinder, and a supplementary mirror adapted to diffuse and reflect the light transmitted from the lamp by way of said apertures over the rear of the said object to be displayed so that the object appears and disappears gradually.

8. An apparatus according to claim 2 including a proscenium provided in front of the opening in the box compartment, said proscenium being provided with an opening adapted to receive advertising matter.

9. An apparatus according to claim 2 including a proscenium provided in front of the opening in the box compartment, said proscenium being provided with an opening adapted to receive advertising matter and a supplementary mirror arranged to reflect light from the source in the rear compartment to illuminate the said advertising matter located in the proscenium opening.

10. An apparatus according to claim 2 wherein the portions of the mirror from which the silvering is removed are in the form of oblique parallel lines some of which are inclined in one direction and others in another direction whereby an illusion is created of water flowing upwardly from a fountain and falling back into the basin of the fountain, the reflected object consisting of a half section of a fountain basin which together with its reflection in the mirror has the appearance of a complete fountain basin.

In testimony whereof he has affixed his signature.

THEODORE BROWN.